Patented Oct. 31, 1933

1,932,907

UNITED STATES PATENT OFFICE 1,932,907

PROCESS OF PREPARING AMINOALKYL-SULPHONIC ACIDS

Otto Nicodemus and Walter Schmidt, Frankfort-on-the-Main-Hochst, Germany, assignors to I. G. Farbenindustrie Aktiengesellschaft, Frankfort-on-the-Main, Germany No Drawing. Application October 18, 1932, Serial No. 638,385, and in Germany June 22, 1931

5 Claims. (Cl. 260—127)

The present invention relates to a new process of preparing aminoalkylsulphonic acids.

We have found that aminoalkylsulphonic acids are obtainable by causing a hydroxyalkylsulphonic acid of the following general formula: $OH-R-R'-SO_3H$, wherein R and R' each stand for a divalent saturated aliphatic hydrocarbon radical or a salt thereof, such as an alkali metal, ammonium or alkaline earth metal salt, to react, in an autoclave, with ammonia or an aliphatic amine which compounds may be identified by the following general formula:

wherein Y and $Y_1$ stand for hydrogen or alkyl.

As aliphatic bases there may be used, for instance, methylamine, ethylamine, diethylamine, butylamine, ethylenediamine and other primary and secondary amines. All hydroxyalkylsulphonic acids and sulphonates are suitable for the purpose of our invention, special examples being hydroxyethanesulphonic acid, hydroxybutanesulphonic acid, hydroxypropanesulphonic acid and hydroxypropanedisulphonic acid.

It will be observed that the free acids as well as their salts, such as the alkali metal, ammonium or alkaline earth metal salts may be used as starting materials. If the salts are used, it may be advantageous to work in an alcoholic or aqueous solution. The temperatures to be applied vary according to the nature of the starting materials used but generally temperatures of about 150° C. to about 300° C. are applied. The reaction takes place with elimination of water and replacement of the hydroxyl group by the amino- or alkylamino group. There are obtained, with a very good yield, a series of aminoalkylsulphonic acids which are valuable intermediate products especially for the preparation of textile auxiliaries.

The process may be carried out in a continuous or discontinuous manner.

It has already been known to prepare aminoalkylsulphonic acids or the salts thereof by causing halogenalkyl sulphonic acids or the salts thereof to react with ammonia or primary aliphatic amines. As compared with this process, the use of hydroxyalkylsulphonic acid according to the present invention offers the advantage that the reaction principally occurs between one mol. of hydroxyalkylsulphonic acid and one mol. of ammonia or of an amine. There are thus obtained when using, for instance, hydroxyalkylsulphonates, as main product, monoaminoalkylsuphonic acids whereas the reaction with halogenalkylsulphonic acids easily leads to di- or tri-substituted aminosulphonic acids. Furthermore, halogenalkylsulphonates react with ammonia or amines always with formation of salts of halogen hydracids. It is difficult to separate these salts from the reaction products since they hardly differ from the latter in their solubility. By using a hydroxyalkylsulphonic acid, however, there is only formed water as by-product. The final product, consequently, is free from salts and may easily be isolated.

The following examples serve to illustrate the invention but they are not intended to limit it thereto, the parts being by weight:

(1) 150 parts of technical hydroxyethane sodium sulphonate of 96% strength are heated for 3 hours at about 250° C. in a steel autoclave together with 500 parts of an aqueous methylamine solution of 40% strength whereby the pressure rises to about 73 atmospheres. The excess of aqueous methylamino solution is then distilled off and there is obtained in a nearly quantitative yield the sodium salt of methyltaurine. According to the analysis there are found:

| Per cent | | Per-cent |
|---|---|---|
| 22.28 C | calculated | C=22.34 |
| 5.3 H | calculated | H= 5.0 |
| 19.31 S | calculated | S=19.9 |

(2) 150 parts of technical hydroxyethane sodium sulphonate of 96% strength are heated as in Example 1 with 500 parts of aqueous ethylamine solution of 33% strength at about 250° C. under a pressure of about 47.5 atmospheres. The reaction solution which has been concentrated by evaporation contains 10% of unaltered parent material, the rest of the solution principally contains ethylaminoethane sodium sulphonate and a small quantity of ethylamine di-ethylsulphonate of the formula:

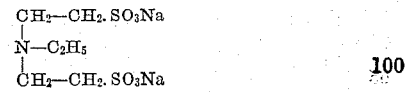

By using a larger excess of ethylamine it is possible to reduce the formation of the di-substituted amine to a considerable extent.

(3) 150 grams of technical hydroxyethane sodium sulphonate of 96% strength are heated in an autoclave with 400 parts of concentrated aqueous ammonia solution for 2 hours at about 240° C. to about 250° C. whereby the pressure rises to about 70 atmospheres. By working up the product in the usual manner there is obtained aminoethane sodium sulphonate with a yield of 80%.

(4) 165 parts of technical hydroxypropane sodium sulphonate of 96% strength are heated with 400 parts of aqueous methlyamino solution, under pressure, at about 250° C. The product is worked up as indicated in the preceding examples and there is obtained methylaminopropane sodium sulphonate with a very good yield.

(5) 154 parts of technical hydroxyethane sodium sulphonate of 96% strength are heated in the form of an aqueous solution of about 50% strength with 465 parts of technical diethylamine and in an autoclave for 3 hours at about 250° C. The product is worked up in the usual manner and there is obtained diethylaminoethane sodium sulphonate.

We claim:

1. A process of preparing aminoalkylsulphonic acids which comprises heating in an autoclave a compound of the following general formula: OH—R—R₁—SO₃X, wherein R and R₁ each stand for a divalent saturated aliphatic hydrocarbon radical and X stands for hydrogen. NH₄, an alkali or an alkaline earth metal atom with a compound of the following general formula:

wherein Y and Y₁ stand for hydrogen or alkyl.

2. A process of preparing aminoalkylsulphonic acids which comprises heating in an aqueous solution a compound of the general formula: OH—R—R₁—SO₃X, wherein R and R₁ each stands for a divalent saturated alphatic hydrocarbon radical and X stands for hydrogen, NH₄, an alkali or an alkaline earth metal atom with a compound of the general formula:

wherein Y and Y₁ stand for hydrogen or alkyl, in an autoclave at a temperature of about 150° C. to about 300° C.

3. A process of preparing aminoalkylsulphonic acids which comprises heating in an aqueous solution a compound of the formula:

$$OH.CH_2.CH_2.SO_3X,$$

wherein X stands for hydrogen or an alkali metal atom, with a compound of the general formula:

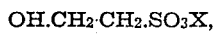

wherein Y stands for hydrogen or alkyl in an autoclave at a temperature of about 150° C. to about 300° C.

4. The process which comprises heating hydroxyethane sodium sulphonate with methylamine in an aqueous solution and in an autoclave at a temperature of about 250° C.

5. The process which comprises heating hydroxyethane sodium sulphonate with ammonia in an aqueous solution and in an autoclave at a temperature of about 240° C. to about 250° C.

OTTO NICODEMUS.
WALTER SCHMIDT.